United States Patent
Torrey et al.

(10) Patent No.: US 7,085,884 B2
(45) Date of Patent: Aug. 1, 2006

(54) SYSTEM AND METHOD FOR STORING OPERATIONAL DATA OF A STORAGE AUTOMATION DEVICE TO A REMOVABLE NONVOLATILE MEMORY COMPONENT

(75) Inventors: William Wesley Torrey, Greeley, CO (US); Colette Toone Howe, Greeley, CO (US); Myron Eugen Yoknis, Fort Collins, CO (US); Rick A. Kato, Greeley, CO (US); Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 422 days.

(21) Appl. No.: 10/611,597

(22) Filed: Jun. 30, 2003

(65) Prior Publication Data

US 2004/0268039 A1 Dec. 30, 2004

(51) Int. Cl.
*G06F 12/00* (2006.01)
(52) U.S. Cl. .................. 711/115; 711/154; 369/34; 436/180; 361/684
(58) Field of Classification Search ............. None
See application file for complete search history.

(56) References Cited

U.S. PATENT DOCUMENTS

| | | | | |
|---|---|---|---|---|
| 5,253,184 A | * | 10/1993 | Kleinschnitz | ............... 702/184 |
| 5,542,082 A | | 7/1996 | Solhjell | |
| 5,867,809 A | * | 2/1999 | Soga et al. | ................ 702/130 |
| 5,973,919 A | * | 10/1999 | Larabell | .................... 361/684 |
| 6,040,186 A | | 3/2000 | Lewis et al. | |
| 6,056,921 A | | 5/2000 | Rao et al. | |
| 6,143,573 A | * | 11/2000 | Rao et al. | ................... 436/180 |
| 6,236,626 B1 | * | 5/2001 | Nagai | .......................... 360/92 |
| 6,256,967 B1 | | 7/2001 | Hebron | |
| 6,381,517 B1 | * | 4/2002 | Butka et al. | ............... 700/247 |
| 6,426,225 B1 | | 7/2002 | Lewis et al. | |
| 6,892,159 B1 | * | 5/2005 | Weiss et al. | ................ 702/130 |
| 2004/0143703 A1 | * | 7/2004 | Emberty et al. | ............ 711/115 |

* cited by examiner

*Primary Examiner*—Mano Padmanabhan
*Assistant Examiner*—Kaushikkumar Patel

(57) ABSTRACT

A cartridge storage system comprising a movable component, a removable nonvolatile memory component (RNMC), and logic configured to store operational data indicative of an operational history of the movable component in the RNMC.

22 Claims, 5 Drawing Sheets

SYSTEM AND METHOD FOR STORING OPERATIONAL DATA OF A STORAGE AUTOMATION DEVICE TO A REMOVABLE NONVOLATILE MEMORY COMPONENT

BACKGROUND OF THE INVENTION

1. Field of the Invention

The present invention relates generally to the field of data storage systems, and more particularly to a system and method for storing operational data of a storage automation device in a removable nonvolatile memory component (RNMC).

2. Related Art

Storage automation systems, e.g., data cartridge storage systems, typically include a host computer and a data storage device. The data storage device typically comprises a cartridge storage element, input/output components, and a moveable cartridge access component, sometimes referred to as a "picker." The cartridge storage element stores a plurality of data cartridges in an array, and each data cartridge in the array has an associated storage position within the cartridge storage element.

During operation, the data storage device may receive, from the host computer, a request for retrieval of a specified data cartridge. The storage device determines, based on the request received from the host computer, a data cartridge position for the requested data cartridge. The movable cartridge access device then moves to that position, retrieves the requested cartridge from the cartridge storage element, moves to the position of an input/output component, for example, a data cartridge drive, and loads the data cartridge into the data cartridge drive.

Moreover, the data storage device may also receive, from the host computer, a request to return a previously retrieved data cartridge to the storage element. The storage device determines, based on such a request, to return received from the host computer, a data cartridge position for storing the foregoing data cartridge. The movable cartridge access device then retrieves the data cartridge from the input/output component, moves the data cartridge to the determined data cartridge location and loads the data cartridge into the cartridge storage element.

Typically, the data storage device further comprises a controller, which is configured to receive requests, such as the cartridge retrieval requests described above, from the host computer and manage the operation of the device in response to the requests. During operation of the storage device, the controller typically retains operational information that is used by the controller for operation and management of the device. When the controller fails, the controller may be replaced. However, the operational information accumulated by the controller during operation of the storage device may be lost and unrecoverable, depending upon the type of failure that occurs. The loss of such data sometimes makes restarting operation and/or evaluating past performance of the data cartridge storage system difficult and problematic.

SUMMARY OF THE INVENTION

The embodiments of the present invention pertain to cartridge storage systems and methods that store operational data to a removable nonvolatile memory component.

One embodiment of a cartridge storage system storage system comprises a movable component, a removable nonvolatile memory component (RNMC), and logic configured to store operational data indicative of an operational history of the movable component in the RNMC.

Another embodiment encompasses a cartridge management method comprising automatically transporting a cartridge from one location within a cartridge storage system to another location within the cartridge storage system and storing operational data related to the transporting to a removable nonvolatile memory component (RNMC).

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION

Figure 1:
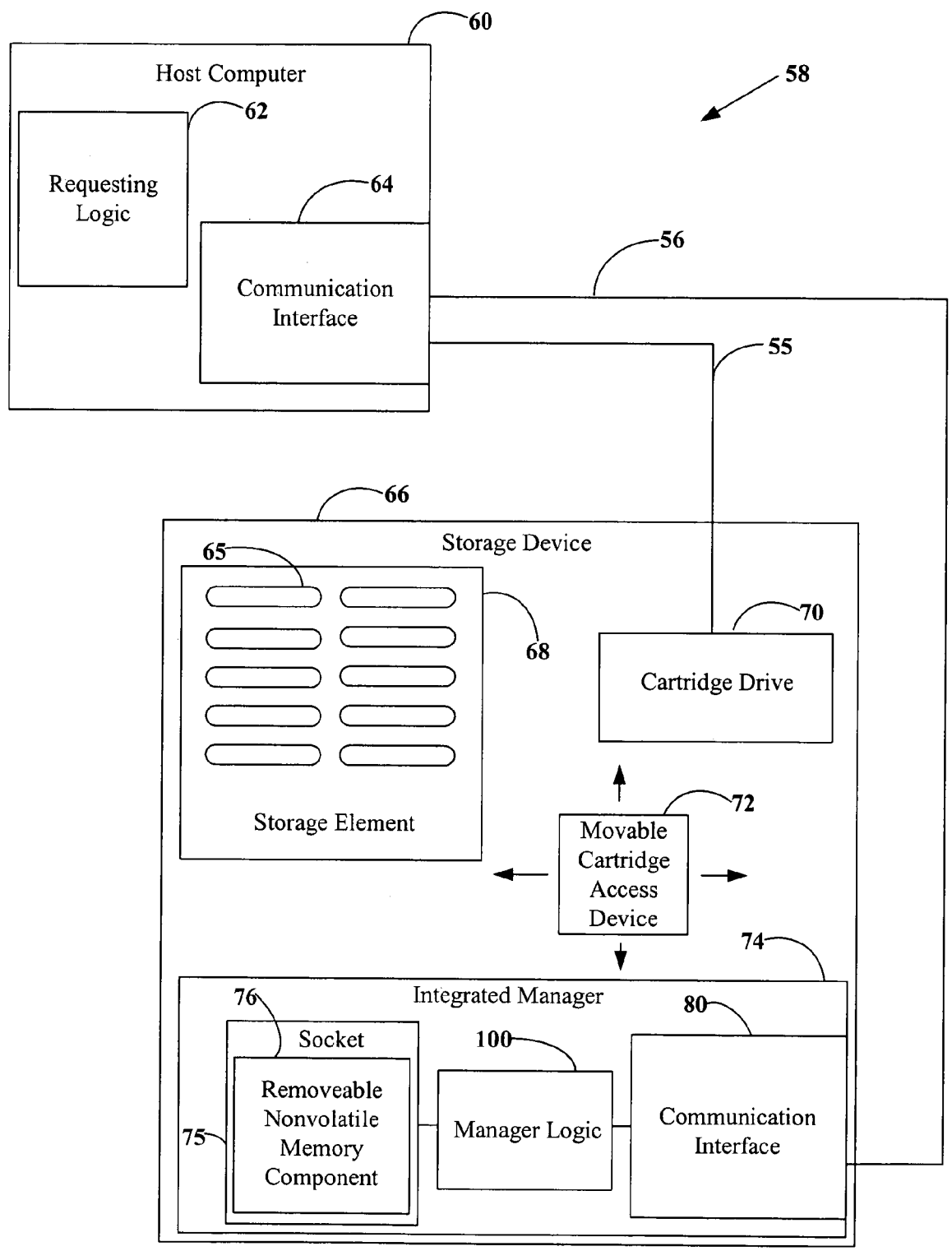
FIG. 1 is a block diagram illustrating an exemplary embodiment of a data storage system in accordance with the present invention.

In general, embodiments of the present invention provide cartridge storage systems and methods for retaining operational information in removable nonvolatile memory components. A cartridge in accordance with various exemplary embodiments of the present invention can comprise a data cartridge, such as, for example, a tape cartridge, compact disc read only memory (e.g., CD-ROM), or diskette. In addition, cartridges can comprise containers, such as vials for storing substances, or other known or future-developed devices. Moreover, an embodiment of a cartridge storage system that stores and transports data cartridges will be described in more detail hereafter with reference to FIG. 1 and FIG. 2. However, it should be noted that, in other embodiments, the cartridge storage system may store and transport other types of cartridges.

A cartridge storage system in accordance with an embodiment of the present invention comprises a removable nonvolatile memory component (RNMC). When the system is functioning properly, operational data is stored in the RNMC. "Operational data" generally refers to data that can subsequently be used to recover an operational state or provide a descriptive history of the cartridge storage system when a component of the system malfunctions. Note that operational data may further comprise information germane to the current state of the data storage system as well as historical information that may be used to evaluate performance of the system to detect past errors or predict future errors.

As mere examples, the RNMC can be used to store operational data indicative of the identification number of various hardware components, system errors or other operational events and/or other operational data that may be used in device recovery, maintenance, or evaluation. For example, the RNMC may be used to reboot a storage device by storing copies of software components that can be loaded at reboot, to store warranty information associated with one or more components of the storage device, and/or to update software upgrades of system components, as will be described in more detail hereafter. Furthermore, in the event that the cartridge storage system malfunctions or in the event of an unexpected power outage or surge, the operational data that is stored in the RNMC is retained and can then be used during system recovery.

Moreover, if the RNMC resides on or is integrated with a failed component of the cartridge storage system, the RNMC can be removed from the failed component, which can then be replaced with an operational component. Further, the RNMC can be positioned on the operational component thereby allowing the failed component to be replaced without losing the operation data stored in the RNMC.

As an example, the RNMC may be mounted on a printed circuit board (PCB) along with a system controller that controls various components of the cartridge storage system. If the system controller fails, the PCB may be removed and replaced with a new PCB having a new system controller that is operational. The RNMC may be removed from the PCB of the failed system controller and mounted on the new PCB such that the components of the cartridge storage system, including the operational controller of the new PCB, have access to the operational data stored in the RNMC.

A cartridge storage system 58 for retaining operational data of a storage device in accordance with one embodiment of the present invention is depicted in FIG. 1. The system 58 preferably comprises a host computer 60 and a storage device 66 connected via connection 56 for communicating therebetween. The storage device 66 comprises a storage element 68 for storing one or more data cartridges 65. In addition, the storage device 66 can comprise a cartridge receiver, for example a cartridge drive 70, that receives data cartridges from the storage element 68. Further, the host computer 60 interfaces to the cartridge drive 70 via connection 55 thereby allowing access to data stored on cartridges 65 that are loaded into the cartridge drive 70.

In this regard, when the host computer 60 needs access to a cartridge 65 residing in the storage element 68, the host computer 60 requests retrieval of the specific cartridge 65 via connection 56. In response, a movable cartridge access device 72, sometimes referred to as a "picker," retrieves the requested cartridge 65 and then loads the cartridge 65 into the cartridge drive 70. The host computer 60 may then access the data contained on the cartridge 65 currently loaded in the cartridge drive 70.

The storage device 66 further comprises an integrated manager 74 for controlling the operation of the storage device 66. The integrated manager 74 preferably comprises a communication interface 80, a socket 75, and manager logic 100. An RNMC 76 is situated within the socket 75, which provides a conductive connection between the RNMC 76 and other components of the integrated manager 74. The RNMC 76 is utilized to store operational data associated with the storage system 58. For example, during a cartridge request and load, process errors may occur. Such errors may include mechanical failures, for example a loading device may malfunction, or software errors. When an error occurs, information for recovery of the storage device 66 is preferably stored to the RNMC 76. As an example, data stored to the RNMC 76 may comprise information describing the position of the various mechanical components (e.g., the movable cartridge access device 72) at the point of failure of the load process. Further, the RNMC 76 can be utilized to store software and firmware capable of operating or managing the storage device 66 and its sub-components.

In general, the integrated manager 74 manages the operation of the device 66 and, in particular, directs a movable cartridge access device 72 to retrieve requested cartridge(s) 65 from the storage element 68 and load the cartridge(s) 65 into the cartridge drive 70. The movable cartridge access device 72 can comprise robotic arms (not specifically shown) to retrieve a cartridge(s) 65 once it is in a location that enables the arms access to a requested cartridge 65.

The operation of the integrated manager 74 is preferably controlled via the manager logic 100, which may be implemented in hardware, software, or a combination thereof. The manager logic 100 may be configured to track and save, to the RNMC 76, operational information that can be used when system components are replaced or when revisions of system components are desirable. In addition, the manager logic 100 can track and save basic system data for operating or evaluating the storage device 66. Note that the communication interface 80 can include a parallel port (e.g., a small computer system interface (SCSI) port), a serial port (e.g., an RS-232C or an RS-422 port) or other type of known or future developed data communication port.

The host computer 60 of the embodiment of the storage system 58, shown in FIG. 1, preferably comprises a communication interface 64 and requesting logic 62. The requesting logic 62 may transmit a "load" request via communication interface 64, requesting that the storage device 66 provide access to a cartridge 65 indicated in the request. In addition, the requesting logic 62 may transmit a "unload" request requesting that the storage device 66 unload the data cartridge 65 and return the cartridge 65 to the storage element 68.

The integrated manager 74 preferably receives the "load" and "unload" requests over connection 56 via communication interface 80. When a "load" or an "unload" request is received by the integrated manager 74, the manager logic 100 detects the request and responds by signaling the movable cartridge access device 72 to retrieve the requested cartridge 65 from either storage element 68 or cartridge drive 70, as the case may be. Preferably, the host computer 60 communicates with the cartridge drive 70 via connection 55. Communication between the host computer 60 and the cartridge drive 70 can be effectuated via a small computer system interface (SCSI) or some other known or future-developed protocol.

Figure 2:
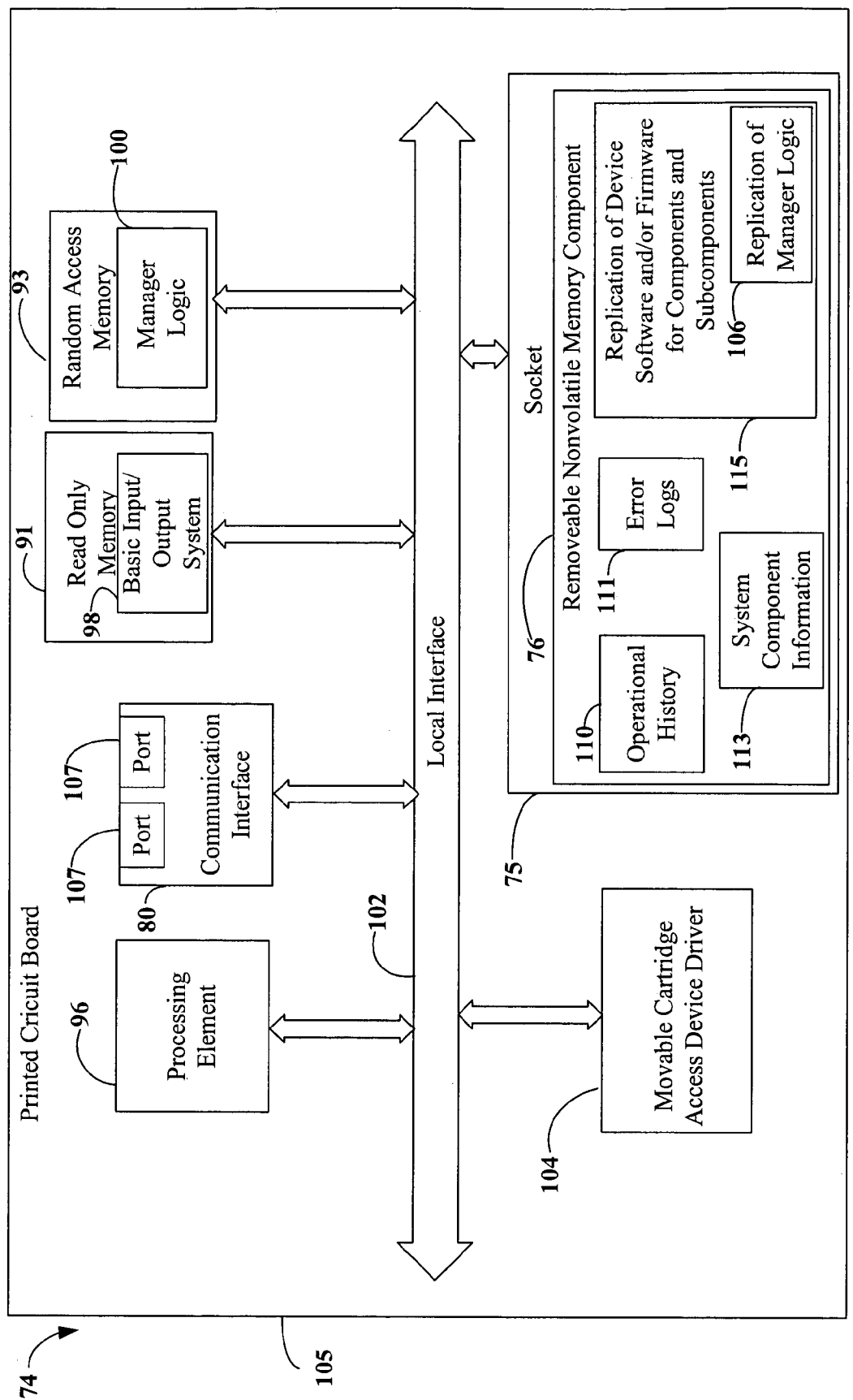
FIG. 2 is a block diagram illustrating an embodiment of an integrated manager, such as is shown in FIG. 1.

FIG. 2 depicts an exemplary embodiment of the integrated manager 74. The integrated manager 74 of FIG. 2 comprises read-only memory (ROM) 91 and random access memory (RAM) 93. The ROM 91 preferably stores a basic input/output system (BIOS) 98, which enables the manager 74 to become operable without accessing additional software or firmware. The operation and functionality of BIOS 98 is discussed further below. As illustrated by way of example in FIG. 2, the manager logic 100 is preferably implemented in software and stored in RAM 93. However, in other embodiments the logic 100 may be implemented in hardware or a combination of hardware and software, and/or the logic 100 may reside within data storage components other than RAM 93.

The manager logic 100, when implemented in software, can be stored and transported on any computer-readable medium for use by or in connection with an instruction execution system, apparatus, or device, such as a computer-based system, processor-containing system, or other system that can fetch and execute instructions. In the context of this document, a computer-readable medium can be any means that can contain, store, communicate, propagate, or transport a program for use by or in connection with the instruction execution system, apparatus, or device. The computer-readable medium can be, for example but not limited to, an electronic, magnetic, optical, electromagnetic, infrared, or semiconductor system apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the manager logic 100 may be magnetically stored and transported on a conventional portable computer diskette.

As shown by FIG. 2, each of the components of the manager 74 reside on a single printed circuit board (PCB) 105 in the preferred embodiment. However, in other embodiments, the integrated manager components may reside on multiple PCBs and/or be interconnected via other types of known or future-developed devices. The PCB 105 can interface with the storage device 66 via an expansion slot, as a daughterboard or as a controller board. Note that the RNMC 76 is preferably implemented as compact flash memory, and the socket 75 residing on the PCB 105 may comprise smart media card connectors, compact flash card connectors, secure digital card connectors, multi media card connectors, memory stick card connectors, or other known or future-developed chip interfaces that enable insertion and removal of the RNMC.

The embodiment of the integrated manager 74 depicted in FIG. 2 comprises one or more system processing elements 96, such as a digital signal processor (DSP) or a central processing unit (CPU), that communicate to and drive the other elements within the manager 74 via a local interface 102, which can include one or more buses. In addition, the manager 74 depicted in FIG. 2 comprises a movable cartridge access device driver 104 that receives requests from manager logic 100 and communicates such requests with the movable cartridge access device 72 (FIG. 1). Note that the movable cartridge access device driver 104 can be implemented in software, hardware or a combination thereof.

RNMC 76 preferably stores operational data, including, but not limited to error logs 111, system component information 113, and copies of software and/or firmware for various components and/or sub-components of the system, for example a copy of the manager logic 106.

When an error occurs during operation of the storage device 66, the manager logic 100 preferably detects the error and writes, to the error logs 111 in the RNMC 76, textual or symbolic data indicative of the detected error. In addition, as normal operational events occur, for example when a cartridge is retrieved from the storage element 68 or the cartridge drive 70 or when a read or write begins to a cartridge loaded into the cartridge drive 70, the manager logic 100 may write, to the operational history 110, textual or symbolic data indicative of normal events that occur during operation.

Furthermore, the manager 100 may be configured to periodically perform tests on the storage device 66 and store results of the tests in the RNMC 76. For example, the manager 100 may periodically perform a hardware inventory of the storage device 66 to determine if new hardware has been added. If the manager 100 performs an inventory and discovers new hardware components, then the manager 100 may download to the system component information 113 of the RNMC 76, data indicative of the new hardware components. Note that the system component information 113 may also comprise serial numbers, warranty information, or maintenance information related various components of the RNMC.

The integrated manager 74 may use the data in the RNMC 76 to determine at what point during a process an error occurred. For example, the operational history 110 may indicate that a cartridge 65 was retrieved upon request, but the error logs 111 may indicate that the cartridge 65 was not loaded into the cartridge drive 70. Therefore, to initiate recovery, the manager logic 100 may retrieve the error log information representing the failed event and, based on this information determine that the first step in the recovery process is to return the cartridge 65 to the storage element 68. Thereafter, the device 66 can operate as normal, waiting for a request for a cartridge 65.

Throughout the load and/or retrieval process, the movable cartridge access device 72 preferably communicates with the manager logic 100 indicating successful completion of each cartridge storage or retrieval. Moreover, the manager logic 100 writes, to the operational history, data that indicates successful completion of each consecutive cartridge storage or retrieval step. Therefore, when an error occurs in the data retrieval or storage process, the operational history of the specific data storage and retrieval process can be retrieved from the RNMC 76. The operational history 110 preferably indicates the last step in the process that completed successfully, and when the device 66 is recovering, the manager logic 100 may begin recovery at the point in the process that last successfully completed. Therefore, the manager logic 100 can use the operational data stored in the error logs 111 and the operational history 110 to reset the mechanical components, as is appropriate.

As indicated in FIG. 2, in addition to the operational history 110 and the error logs 111, the RNMC 76 can further store system component information 113. As described herein, system component information can comprise hardware type information, serial number data, and/or warranty data. For example, the system component information can include the serial number of the movable cartridge access device 72 and/or the cartridge drive 70. In another example, the system component information 113 may include warranty data indicative of the terms associated with the manufacturer's warranty of at least one component of the storage device 66. The system component information 113 may be loaded into the RNMC 76 at any time, including when the storage device 66 is manufactured and setup for operation. Thus, each hardware component implemented on the storage device 66 can be listed and described in the system component information 113.

In addition, the system component information 113 may comprise, for example, a serial number of the storage device 66. Such a number can be used for warranty purposes as a key, to ensure that the RNMC 76 is only used with the storage device 66 for which the RNMC is configured (e.g., to ensure that the serial number of the data storage device 66 corresponds to the serial number stored in the RNMC 76). For example, during manufacturing, the RNMC 76 may be programmed with the serial number of the storage device 66 in which it is being installed. As will be described in more detail hereafter, if the manager 74 malfunctions and is replaced, the RNMC 76 may be removed from the PCB 105 of the defective manager 74 and installed on a replacement PCB 105. The manager logic 100 can then retrieve the identification number of the storage device 66 from the RNMC 76, and compare the identification number with that of the data storage device serial number. If the retrieved numbers correspond (i.e., match), then the RNMC 76 has been inserted into the correct data storage device. If the numbers do not correspond, then the manager 74 generates a warning message or activates a warning indicator (not specifically shown). This process may prevent the misuse of an RNMC 76 in a data storage device 66 for which it is not designed to be used.

In addition to the serial number of the storage device 66, the system component information 113 can comprise the serial numbers of other hardware components, such as, for example, the data cartridge drive 70 (FIG. 1), the data cartridge array 68 (FIG. 1), and/or the communication interface 80 (FIG. 1). The manager logic 100 preferably tracks the hardware components and variables related to the components, for example, the date of installation, the time used, and/or the number of failures for a particular component. This information can be stored on the RNMC 76. Thus, throughout the life of the storage device 66, the foregoing information is available for use in various ways, including determining warranty information for malfunctioning parts that need to be replaced or serviced. As an example, warranty information regarding one of the device's components may be retrieved from the RNMC 76 and utilized by a manufacturer, retailer, or service technician of the one component in order to determine whether the one component is to be replaced or serviced at a reduced cost. In addition, the foregoing information may also be utilized to diagnose problems associated with the tracked components.

In addition to storing operational history 110, error logs 111 and system component information 113, the RNMC 76 can also store replications of software and/or firmware for system components 115. When the manager 74 malfunctions, the PCB 105 may be removed from the storage device 66, and the RNMC 76 may be detached from the removed PCB 105. A replacement PCB 105 may then be installed in the device 66 to replace the removed PCB 105. The RNMC 76 detached from the removed PCB 105 may then be interconnected with the socket 75 of the replacement PCB 105.

When power is provided to the storage device 66, the BIOS 98 executes at power-up. When the manager logic 100 is implemented in software, the logic 100 may be stored in the RNMC 76, and the BIOS 98 may be configured to retrieve the manager logic 100 from the RNMC 76 and write the manager logic 100 into RAM 93 at power-up. The manager logic 100 may then be executed by the processing element 96. In addition, other software and/or firmware that is stored on the RNMC 76 for operating other components of the storage device 66 can be loaded and executed, such as software for implementing the movable cartridge access device driver 104, for example.

As shown in FIG. 2, the communication interface 80 of the integrated manager 74 may comprise a plurality of ports 107. One of the ports 107 may be utilized to exchange data with the host computer 60. The other port 107 may be used to access information related to the storage device 66. For example, a laptop computer (not specifically shown) or some other data communication device may be connected to one of the ports 107. This laptop computer may be configured with a utility or a graphical user interface (GUI) that enables a user of the laptop to access the data stored on the RNMC 76. In particular, a user could copy software and/or firmware revisions for the hardware components of the storage device 66 to the RNMC 76, thereby invasively updating the software and/or firmware. Note that software and/or firmware upgrades could also be performed by removing the RNMC 76 from the manager 74, copying software and/or firmware upgrades to the RNMC 76 while the RNMC 76 is detached from the manager 74, and reinserting the RNMC 76 into the manager 74 for reprogramming by the BIOS of the manager logic 100. The ports 107 can be configured to communicate via RS-232, RS-422, small computer standard interface (SCSI), or any other known or future-developed protocols.

Figure 3:
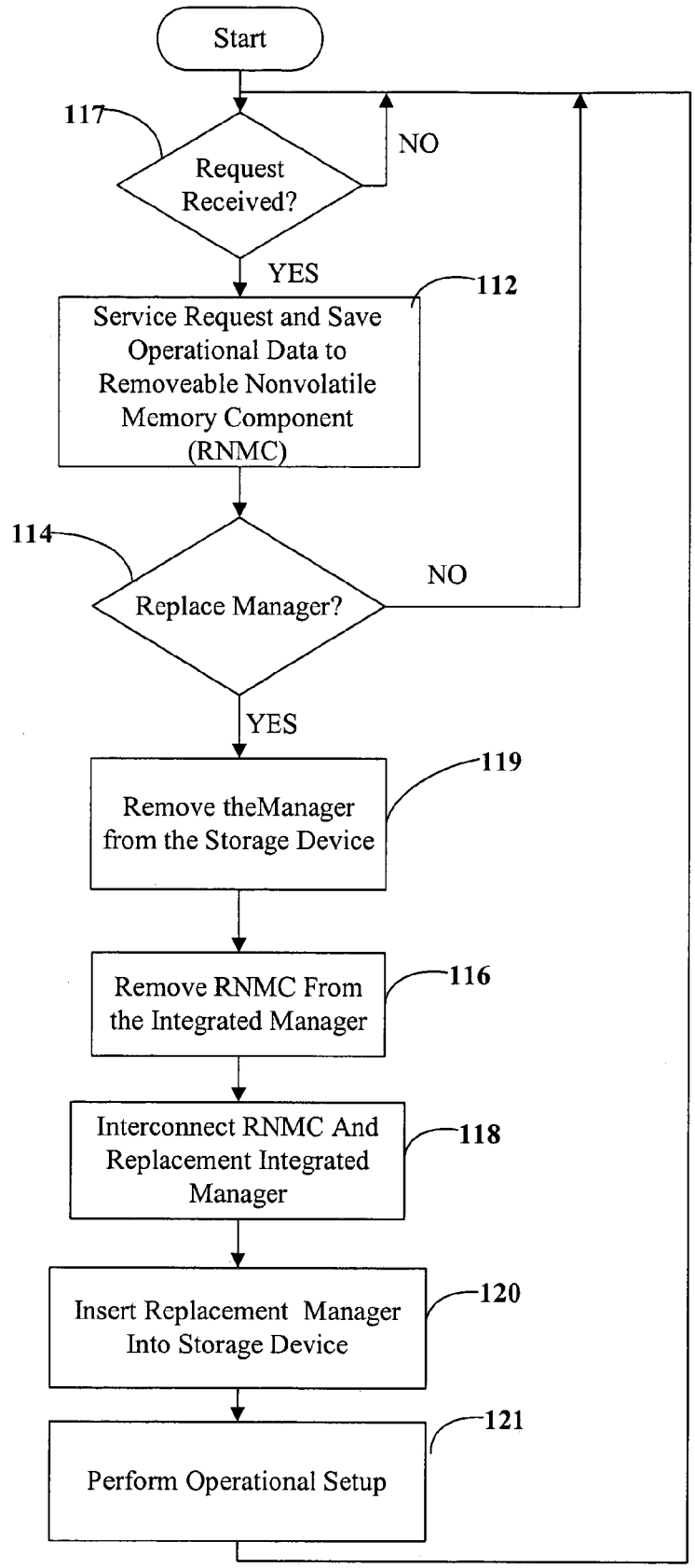
FIG. 3 is a flowchart illustrating an exemplary process for retaining operational data associated with a data storage system, such as is shown in FIG. 1.

FIG. 3 depicts an embodiment of an operational methodology for the storage device 66. The manager logic 100 of the manager 74 awaits a request from the host computer 60, as indicated by block 117. If a request is received, the manager logic 100 services the request and saves operational data to the RNMC 76 as indicated by block 112. A request from the host computer 60 may include, but is not limited to, a request to load a data cartridge, a request to unload a data cartridge that was previously loaded, or a request to move a data cartridge currently stored in the storage element 68 to a different location within storage element 68. In addition, the operational data preferably indicates actions (e.g., retrieving the requested cartridge 65, moving the requested cartridge, loading the requested cartridge 65, etc.) that are completed in servicing the received request, which are stored in operational history 110. The operational data may also indicate any operational errors that are detected in servicing the received request, which are stored in error logs 111.

Blocks 112 and 117 are preferably repeated until a malfunction of the manager 74 occurs, such that replacement of the manager 74 is desirable. Once a malfunction occurs, the manager 74 is removed from the data storage device 66, as indicated by blocks 114 and 119. This may be accomplished by removing the PCB 105 (FIG. 2) on which the manager 74 resides. The RNMC 76, which is plugged into the socket 75 of the integrated manager 74, is manually removed from the malfunctioning integrated manager 74, as indicated by block 116. The RNMC 76 is then inserted into or interconnected with the socket 75 of a replacement integrated manager 74, as indicated by block 118, and the replacement integrated manager 74 can then be inserted into the storage device 66, as indicated by block 120.

Note that when the replacement integrated manager 74 is inserted into the storage device 66, it is not necessary for the manager logic 100 and/or any component, such as the movable cartridge access device driver 104, to be initially stored in the replacement manager 74. In addition, the mechanical components of the storage device 66 may need resetting if the task being performed at the time of the malfunction did not complete. Moreover, the replacement integrated manager 74 performs an operational setup as indicated by block 121.

Figure 4:
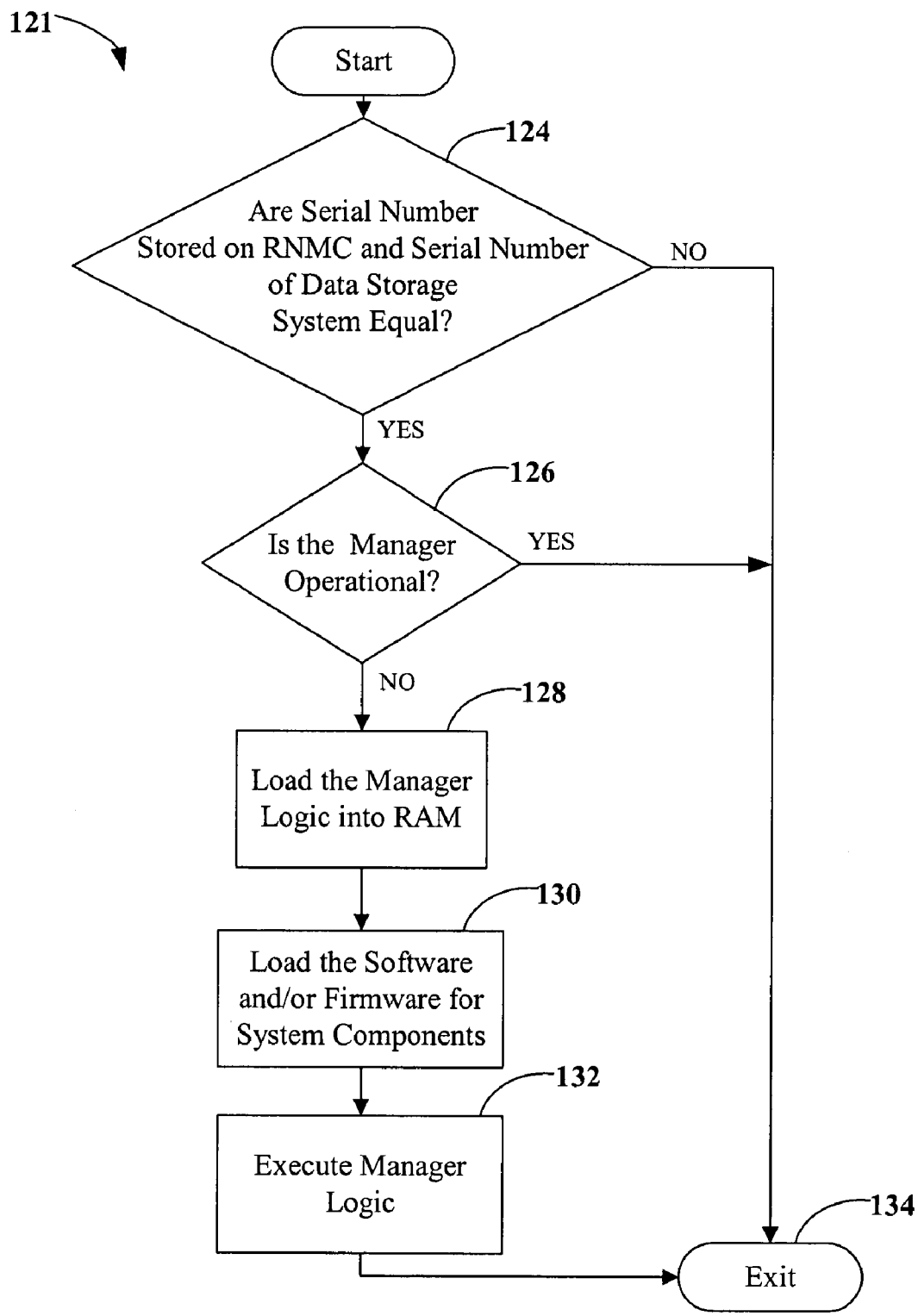
FIG. 4 is a flowchart illustrating an exemplary architecture and functionality of a data storage system, such as is depicted in FIG. 1.

An exemplary operational setup performed via block 121 is described in more detail with reference to FIG. 4. The operational setup 121 can be performed by the basic input/output system (BIOS) that resides on the manager 74. As indicated by block 124, to prevent use of the RNMC 76 with the incorrect storage device 66, the BIOS 98 preferably compares the identification number stored on the RNMC 76 with the identification number of the storage device 66. Note that the comparison can be performed by other logic accessible by the processing unit of the manager 74.

If the identification numbers are found to be equivalent, then the BIOS 98 continues the setup process. If the manager 74 is operational, as indicated by block 126, then the setup process terminates, as indicated by block 134. The integrated manager 74 is operational if the manager logic 100 is loaded and software and/or firmware 115 are loaded to control the various components and/or sub-components of the system. If the integrated manager 74 is operational, then the setup process exits as indicated in block 134. At block 134, the manager 100 returns to block 117 to await a next request.

If the integrated manager 74 is not operational, the integrated manager 74 loads the manager logic 100 into RAM 93, as indicated by block 128. The integrated manager 74 then loads software and/or firmware for system components and/or sub-components of the data storage system 66, as indicated by block 130. The BIOS 98 then executes the manager logic 100, as indicated in block 132.

Figure 5:
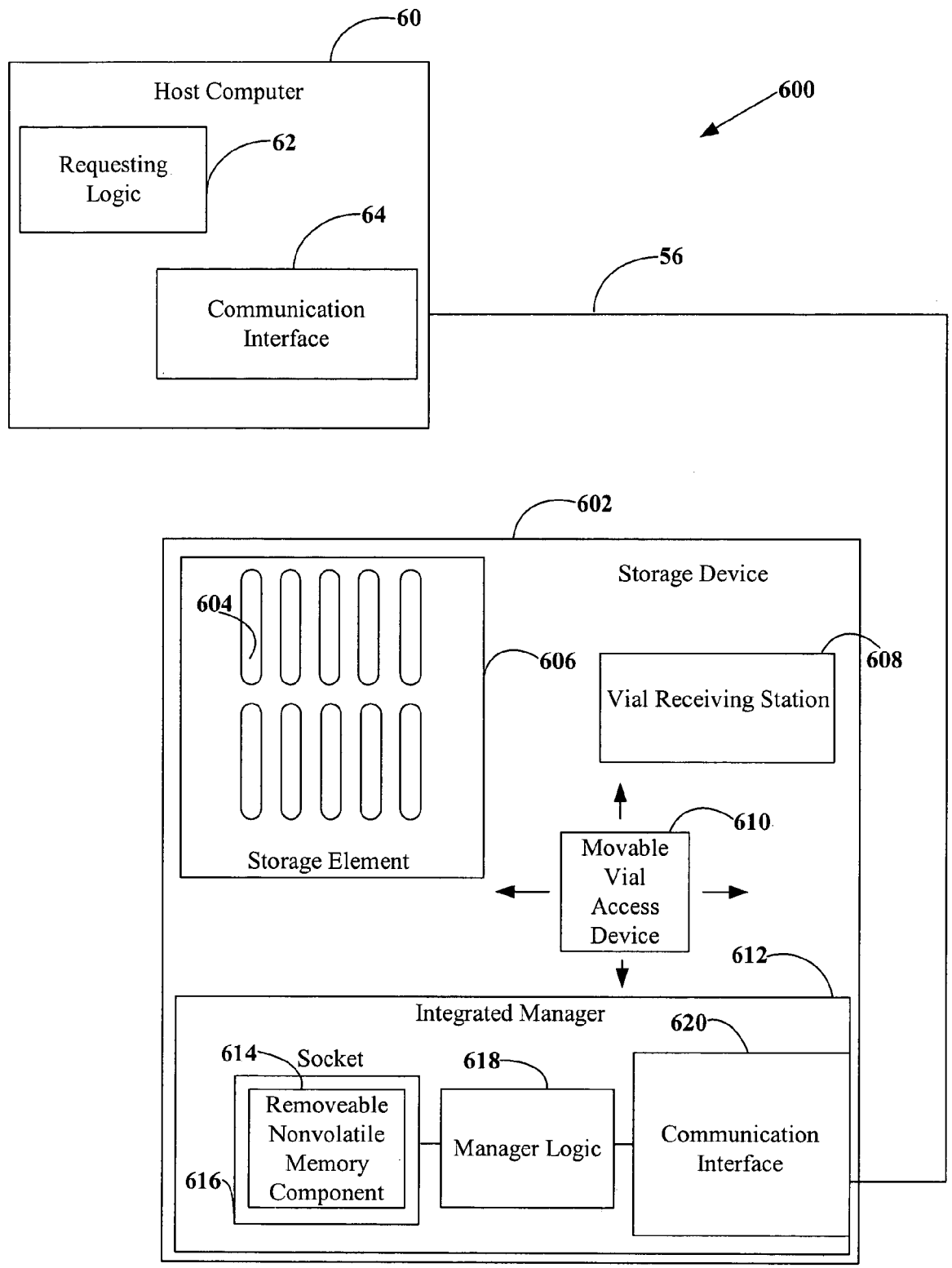
FIG. 5 is a block diagram illustrating an exemplary embodiment of a vial storage system in accordance with the present invention.

Another exemplary embodiment of a cartridge storage system 600 is illustrated in FIG. 5. As mentioned above, the storage device 66 may be configured for storing vials of materials, for example chemical specimens, that are to be sampled and analyzed. Such a device is illustrated by the storage system 600 of FIG. 5, which preferably comprises a host computer 60 and a storage device 602 connected via connection 56 for communicating therebetween. The storage device 602 comprises a storage element 606 for storing one or more vials 604 containing chemical specimens that are to be analyzed. The storage device 602 further comprises a vial receiving station 608 that receives vials 604 from the storage element 606 via movable vial access device 610.

In this regard, the integrated manager 612 may behave similar or identical to the integrated manager 74 discussed with reference to FIG. 1 and FIG. 2, such that the manager logic 618 writes operational data, including error logs, operational history, and or system component information to the RNMC 614, during operation of the storage device 602.

Now, therefore, the following is claimed:

1. A cartridge storage system comprising:
a movable component;
a removable nonvolatile memory component (RNMC) residing on a first printed circuit board, the RNMC storing operational data indicative of an operational history of the movable component when the RNMC resided on a second printed circuit board; and
logic configured to operate the movable component in response to the cartridge storage system detecting an error based upon the operational data stored in the RNMC residing on the first printed circuit board.

2. The storage system as claimed in claim 1, wherein the movable component comprises a data cartridge.

3. A storage system as claimed in claim 1, wherein the movable component comprises a vial.

4. A storage system as claimed in claim 1, wherein the movable component comprises a movable cartridge access device.

5. The storage system as claimed in claim 4, wherein the logic is configured to receive a cartridge retrieval request, the logic further configured to instruct the movable cartridge access device to retrieve a cartridge and to load the cartridge into a cartridge receiver.

6. The storage system as claimed in claim 5, wherein the movable cartridge access device is configured to communicate data indicative of mechanical events to the logic, the logic further configured to receive and to store the data in the RNMC.

7. The system as claimed in claim 1, wherein the logic is further configured to save system component identification numbers to the RNMC.

8. The storage system as claimed in claim 1, wherein the RNMC and the logic reside on a single printed circuit board.

9. A cartridge storage system comprising:
a cartridge access device;
a removable nonvolatile memory component (RNMC) residing on a first printed circuit board, the RNMC storing operational data indicative of an operational history of the movable component when the RNMC resided on a second printed circuit board; and
means for operating the movable component in response to the cartridge storage system detecting an error based upon the operational data stored on the RNMC residing on the first printed circuit board.

10. The system as claimed in claim 9, wherein the storing means and the RNMC reside on a single printed circuit board.

11. The system as claimed in claim 10, wherein the cartridge is a data cartridge and the movable cartridge access device is configured to load the data cartridge into a cartridge drive.

12. The system as claimed in claim 10, wherein the cartridge is a vial and the movable cartridge access device is configured to load the vial into a vial receiving station.

13. A cartridge management method comprising:
automatically transporting a cartridge from one location within a cartridge storage system to another location within the cartridge storage system;
storing operational data related to the transporting to a removable nonvolatile memory component (RNMC) coupled to a first printed circuit board;
replacing the first printed circuit board with a second printed circuit board;
coupling the RNMC to the second printed circuit board; and
automatically determining, based upon the operational data, the location of the cartridge.

14. The method as claimed in claim 13, wherein the cartridge is a data cartridge.

15. The method as claimed in claim 14, further comprising loading the data cartridge into a cartridge drive.

16. The method as claimed in claim 13, wherein the cartridge is a vial.

17. The method as claimed in claim 16, further comprising loading the vial into a vial receiving station.

18. A cartridge management method comprising:
automatically transporting a cartridge from one location within a cartridge storage system to another location within the cartridge storage system;
storing operational data related to the transporting to the removable nonvolatile memory component (RNMC) residing on a printed circuit board (PCB);
replacing the first PCB with a second PCB; and
moving the RNMC from the first PCB to the second PCB.

19. The method as claimed in claim 18, further comprising detecting a failure of a component on the first PCB, wherein the replacing is performed in response to the detecting.

20. A method for managing a cartridge storage system, comprising:
transporting a cartridge from one location to another location within the cartridge storage system;
controlling the transporting, via a first integrated manager, the first integrated manager comprising a removable nonvolatile memory component (RNMC);
storing data indicative of the controlling to the RNMC;
removing the RNMC from the first integrated manager;
attaching the RNMC to a second integrated manager; and
controlling operation of the cartridge storage system, via the second integrated manager, based on data stored in the RNMC.

21. The method as claimed in claim 20, wherein the cartridge is a data cartridge.

22. The method as claimed in clam 20, wherein the cartridge is a vial.

* * * * *

UNITED STATES PATENT AND TRADEMARK OFFICE
CERTIFICATE OF CORRECTION

PATENT NO.         : 7,085,884 B2
APPLICATION NO.    : 10/611597
DATED              : August 1, 2006
INVENTOR(S)        : William Wesley Torrey et al.

It is certified that error appears in the above-identified patent and that said Letters Patent is hereby corrected as shown below:

In column 10, line 63, in Claim 22, delete "clam" and insert -- claim --, therefor.

Signed and Sealed this

Fifth Day of May, 2009

JOHN DOLL
*Acting Director of the United States Patent and Trademark Office*